United States Patent [19]
Ise

[11] Patent Number: 5,943,545
[45] Date of Patent: Aug. 24, 1999

[54] METHOD OF MANUFACTURING A HYDROGEN-ABSORBING ALLOY FOR USE IN AN ALKALI STORAGE CELL

[75] Inventor: Tadashi Ise, Itano-gun, Japan

[73] Assignee: Sanyo Electric Co., Ltd., Moriguchi, Japan

[21] Appl. No.: 08/979,698

[22] Filed: Nov. 26, 1997

[30] Foreign Application Priority Data

Nov. 29, 1996 [JP] Japan .................................. 8-319602

[51] Int. Cl.$^6$ ...................................................... B22F 1/00
[52] U.S. Cl. .................................. 419/31; 419/2; 419/34; 148/513
[58] Field of Search .................................. 419/2, 31, 34; 148/513

[56] References Cited

U.S. PATENT DOCUMENTS

| | | | |
|---|---|---|---|
| 5,149,383 | 9/1992 | Seri et al. | 148/400 |
| 5,468,260 | 11/1995 | Takee et al. | 29/23.5 |
| 5,518,509 | 5/1996 | Tadokoro et al. | 29/693.5 |
| 5,529,857 | 6/1996 | Nogami et al. | 429/59 |
| 5,605,585 | 2/1997 | Yamamoto et al. | 148/513 |
| 5,629,000 | 5/1997 | Matsuura et al. | 429/218 |
| 5,629,111 | 5/1997 | Yamawaki et al. | 429/223 |
| 5,688,616 | 11/1997 | Yamawaki et al. | 429/223 |
| 5,691,086 | 11/1997 | Baba et al. | 429/218 |
| 5,702,762 | 12/1997 | Baba et al. | 427/212 |
| 5,827,413 | 10/1998 | Yamiguchi et al. | 204/293 |

*Primary Examiner*—Daniel J. Jenkins
*Attorney, Agent, or Firm*—Foley & Lardner

[57] ABSTRACT

The object of the present invention is to provide an acid treatment for enhancing the high-rate discharge characteristic, cycle characteristic, and other characteristics of a hydrogen-absorbing alloy electrode to a large extent. The object can be achieved by subjecting a hydrogen-absorbing alloy as a negative electrode active material to an acid treatment comprising the steps of acid-treating the surface of the hydrogen-absorbing alloy by using a metallic ion-containing treatment solution which contains metallic ions and whose initial pH is in the range of 0.5 to 3.0; and heat-treating the hydrogen-absorbing alloy in an atmosphere with the presence of hydrogen.

22 Claims, No Drawings

METHOD OF MANUFACTURING A HYDROGEN-ABSORBING ALLOY FOR USE IN AN ALKALI STORAGE CELL

BACKGROUND OF THE INVENTION

(1) Field of the Invention

The present invention relates to a method of manufacturing a hydrogen-absorbing alloy for use in an alkali storage cell, and more specifically to a method of acid-treating the hydrogen-absorbing alloy and an improvement in a treatment which follows the acid treatment.

(2) Description of the Prior Art

In a nickel-hydrogen storage cell where a hydrogen-absorbing alloy is used as a negative electrode active material, the cell performance is affected by the activity of the alloy. For this reason, the hydrogen-absorbing alloy used in this type of storage cell is pulverized into fine powder so as to expand an area concerned with an electrochemical reaction and to enhance the filling density of the electrode substrate, thereby enhancing energy density.

However, a hydrogen-absorbing alloy is so active that it is oxidized during pulverization or in storage, forming an oxidation coating over its surface. This oxidation coating deteriorates the electric conductivity and electrochemical reactivity of the alloy.

To solve these problems, various methods of restoring the electrochemical activity of a hydrogen-absorbing alloy have been suggested. One of such methods is an acid treatment disclosed, for example, in Japanese Laid-open Patent Application Nos. 4-179055, 7-73878, and 7-153460 where the surface of a hydrogen-absorbing alloy is treated with an acid aqueous solution. This acid treatment is characterized by its simple operation and excellent effects of removing an oxidation coating, so that the application of this treatment can facilitate the restoration of the electrochemical activity of a hydrogen-absorbing alloy.

However, even this treatment fails to sufficiently enhance the high-rate discharge characteristic, cell internal pressure characteristic, and cycle characteristic, so that a further improvement has been expected.

SUMMARY OF THE INVENTION

The object of the present invention is, in an acid treatment which treats the surface of a hydrogen-absorbing alloy with an acid solution and in a subsequent treatment, to establish treatment conditions which can enhance the high-rate discharge characteristic, cycle characteristic, and other characteristics of a hydrogen-absorbing alloy electrode to a large extent.

Through their strenuous research on the acid treatment for a hydrogen-absorbing alloy, the inventors of the present invention have found that the electrochemical activity of a hydrogen-absorbing alloy can be remarkably enhanced by adding metallic ions to an acid treatment solution and by applying a heat treatment to the hydrogen-absorbing alloy in an atmosphere with the presence of hydrogen after the application of the acid treatment. They also have found that the electrochemical activity of a hydrogen-absorbing alloy can be further enhanced by soaking the alloy in an alkali solution before the application of the heat treatment.

The first mode of the present invention is a method of manufacturing a hydrogen-absorbing alloy for use in an alkali storage cell comprising a first step of applying an acid treatment to the surface of the hydrogen-absorbing alloy by using a metallic ion-containing treatment solution which contains metallic ions and whose initial pH is in the range of 0.5 to 3.0; and a second step of applying a heat treatment to the hydrogen-absorbing alloy in an atmosphere with the presence of hydrogen.

The second mode of the present invention is a method of manufacturing a hydrogen-absorbing alloy for use in an alkali storage cell comprising a first step of applying an acid treatment to the surface of the hydrogen-absorbing alloy by using a metallic ion-containing treatment solution which contains metallic ions and whose initial pH is in the range of 0.5 to 3.0; a second step of applying an alkali treatment to the surface of the hydrogen-absorbing alloy by using an alkali solution; and a third step of applying a heat treatment to the hydrogen-absorbing alloy in an atmosphere with the presence of hydrogen.

The metallic ions can be selected from nickel ions, cobalt ions, and a combination of nickel ions and cobalt ions.

The metallic ion-containing treatment solution may have a pH buffer capacity for keeping the pH of the metallic ion-containing treatment solution within the range of 4 to 6.

The metallic ion-containing acid treatment solution may contain aluminum ions and nickel ions and/or cobalt ions.

The temperatures of the heat treatment in the first and second modes can be in the range of 300 to 900° C.

The hydrogen-absorbing alloy in the first and second modes can be prepared by a gas atomizing process.

The alkali solution in the second step of the second mode may contain alkali metal whose concentration is in the range of 15 to 40 wt %.

The present invention thus constructed will be detailed as follows.

The present invention is characterized in that a hydrogen-absorbing alloy powder is produced by either a pulverization process where a hydrogen-absorbing alloy ingot is pulverized or a gas atomizing process where a melted alloy is sprayed from a nozzle by a gas pressure, and that the surface of the alloy powder is acid-treated with a metallic ion-containing acid treatment solution whose initial pH is in the range of 0.5 to 3.0 and then heat-treated in an atmosphere with the presence of hydrogen.

When an alkali storage cell is manufactured by using a hydrogen-absorbing alloy produced by this method, the high-rate discharge characteristic and cycle characteristic are remarkably enhanced. The reasons for the enhancement will be described as follows.

First, the hydrogen-absorbing alloy is soaked in a strong acid and cleaned (surface treatment) which enhances the electrochemical reactivity of the alloy due to the following reasons. When a hydrogen-absorbing alloy is soaked in a strongly acidic treatment solution, while the pH of the solution is in the range of 0.5 to 4., the alloy components such as rare-earth elements, nickel, cobalt, or oxides or hydroxides of these elements react with hydrogen ions contained in the treatment solution and are eluted in the treatment solution The pH of the treatment solution increases in accordance with the elution. Since the solubility and the rate of elution of the alloy components while the pH is on the increase are not uniform, the elution makes the alloy surface uneven, thereby expanding the specific surface of the alloy. In addition, the elution of metallic oxides and the like causes an isolation layer of nickel or cobalt over the alloy surface, which improves the low temperature discharge characteristic and cycle characteristic of the hydrogen-absorbing alloy.

However, the pH of the treatment solution increases beyond 4. Since the solubility of the alloy components is pH dependent, when the pH increases close to 5, the rare-earth elements and other elements which are dissolved in the treatment solution when the pH is in the range of 0.5 to 4 are precipitated again as hydroxides and accumulated on the alloy surface. As a result, a close layer consisting of hydroxides of rare-earth elements or other elements is formed on the alloy surface. Since this close layer blocks the oxygen consumption reaction of the hydrogen-absorbing alloy, the cell internal pressure characteristic and other characteristics are deteriorated.

In the present invention, however, the hydrogen-absorbing alloy is heat-treated in an atmosphere with the presence of hydrogen after the application of the acid treatment, so that hydroxides are reduced to the state of a metal, and consequently, the alloy surface is coated with a metal such as nickel or cobalt. As a result, conductivity is improved, which leads to an improvement of the cell internal pressure characteristic and high-rate discharge characteristic. In addition, the heat treatment decreases the segregation of the alloy, and nickel or cobalt in parts is alloyed so as to form a highly anti-corrosive alloy layer over the alloy surface, thereby improving the cycle characteristic.

As the acid for the acid treatment solution, hydrochloric acid may be replaced by nitric acid, sulfuric acid, fluoric acid, phosphoric acid, or the like.

As the metallic ions, cobalt can be replaced by nickel, copper, calcium, silicon, or the like. It is preferable to use nickel and/or cobalt. The reason for their preference is considered that these metals are excellent in conductivity and catalyzes the oxygen consumption reaction on the alloy surface.

Furthermore, by adding aluminum ions to the acid treatment solution with which the alloy is acid-treated, the high-rate discharge characteristic, cycle characteristic, and other characteristics can be further improved. This is because aluminum ions has a pH buffer capacity in the range of 4 to 6 for keeping the pH in the range of 4 to 6 as long as possible. This effect causes more metallic ions contained in the treatment solution to precipitate and adhere onto the alloy surface. As a result, the corrosion resistance of the alloy improves, which leads to an improvement of the electrochemical characteristic of the alloy. As such ions having a pH buffer capacity as aluminum ions, beryllium ions, zirconium ions, and the like are available.

Although the temperature of the heat treatment is not restricted, the preferable range is 300 to 900° C. When the temperature is below 300° C., the heat treatment effect is insufficient while when it is over 900° C., hydrogen reacts with rare-earth elements contained in the hydrogen-absorbing alloy, so as to produce hydroxides of rare-earth elements.

In addition, by soaking the hydrogen-absorbing alloy in an alkali solution before the application of the heat treatment, the cell internal pressure characteristic and other characteristics can be further improved. This is because cobalt hydroxides or the like generated during the acid treatment become oxo-acid ions when the alloy is soaked in the alkali solution, so that the alloy surface can be evenly coated with cobalt or the like when the heat treatment is conducted in the presence of hydrogen. The alkali concentration of the alkali solution used in this case is preferably in the range of 15 wt % to 40 wt % because the alkali impregnating effect is insufficient when it is below 15 wt %, while it is difficult to produce an alkali solution having alkali concentration of over 40 wt %.

Furthermore, it is preferable that the present invention is applied to a hydrogen-absorbing alloy produced by a gas atomizing process in order to further improve the cell internal pressure characteristic, high-rate discharge characteristic, and cycle life characteristic. The reason for the improvement is considered that according to the gas atomizing process, alloy particles having similar diameters and small specific surfaces are obtained and mechanical pulverization which may cause surface oxidation is unnecessary.

Such an alloy activation treatment of the present invention is applicable to various types of hydrogen-absorbing alloy for use in an alkali storage cell, such as rare earth system, titanium system, zirconium system, and magnesium system.

DESCRIPTION OF THE PREFERRED EMBODIMENTS

The present invention will be described based on the following embodiments.

(EMBODIMENT 1)

First, commercially available misch metal (Mm; a mixture of rare-earth elements such as La, Ce, Nd, and Pr), nickel (Ni), cobalt (Co), aluminum (Al), and manganese (Mn) were mixed in an elementary ratio 1:3.4:0.8:0.2:0.6, so as to produce a hydrogen-absorbing alloy ingot expressed by $MmNi_{3.4}Co_{0.8}Al_{0.2}Mn_{0.6}$ in a high-frequency furnace.

Then, the hydrogen-absorbing alloy ingot was pulverized in a ball mill with 1 liter of water per 1 kilogram of the ingot so as to produce a hydrogen-absorbing alloy powder having an average particle diameter of 50 $\mu$m. This alloy powder is referred to as the alloy $\hat{1}$.

The alloy $\hat{1}$ was subjected to an acid treatment as follows. A hydrochloric acid solution having an initial pH of 0.5 was prepared and 1 wt % cobalt hydroxide was dissolved in the solution so as to prepare a hydrochloric acid solution containing cobalt ions (a metallic ion-containing acid treatment solution). By using this treatment solution, an acid treatment was applied to the alloy $\hat{1}$. As the acid treatment, the same amount of the treatment solution as the alloy $\hat{1}$ was added to the alloy $\hat{1}$ and stirred in an agitator until the pH of the treatment solution became 7. The alloy thus acid-treated was washed with refined water.

After this washing, the acid-treated alloy was subjected to a heat treatment in a hydrogen gas atmosphere (1atm) for 10 hours at 800° C., so as to produce a hydrogen-absorbing alloy for use in an alkali storage cell of the present invention.

The hydrogen-absorbing alloy thus produced is hereinafter referred to as the alloy A1 of the present invention.

(EMBODIMENTS 2–4)

Three other hydrogen-absorbing alloys were produced in the same manner as in the embodiment 1 except that the initial pH of the hydrochloric acid was set to 1, 2, and 3, respectively.

The hydrogen-absorbing alloys thus produced are hereinafter referred to as the alloys A2, A3, and A4 of the present invention, respectively.

(EMBODIMENTS 5–8)

Four other hydrogen-absorbing alloys were produced in the same manner as in the embodiment 2 except that nickel hydroxide (1 wt %), nickel hydroxide+cobalt hydroxide (1 wt % each), copper hydroxide (1 wt %), and cobalt hydroxide+aluminum hydroxide (1 wt % each) were used, respectively, in place of cobalt hydroxide as the materials to be dissolved in the hydrochloric acid solution.

The hydrogen-absorbing alloys thus produced are hereinafter referred to as the alloys A5, A6, A7, and A8 of the present invention, respectively.

(EMBODIMENTS 9–12)

Four other hydrogen-absorbing alloys were produced in the same manner as in the embodiment 2 except that the heat treatment temperatures were set at 3000° C., 500° C., 900° C., and 1000° C., respectively.

The hydrogen-absorbing alloys thus produced are hereinafter referred to as the alloys A9, A10, A11, and A12 of the present invention, respectively.

(EMBODIMENTS 13–16)

Four other hydrogen-absorbing alloys were produced in the same manner as in the embodiment 2 except that the hydrogen-absorbing alloys were treated with an alkali solution (KOH solutions whose concentrations were 5 wt %, 15 wt %, 30 wt %, and 40 wt %, respectively) before the application of the heat treatment.

The hydrogen-absorbing alloys thus produced are hereinafter referred to as the alloys A13, A14, A15, and A16 of the present invention, respectively.

(EMBODIMENT 17)

Another hydrogen-absorbing alloy was produced in the same manner as in the embodiment 15 except that a gas atomizing process was conducted under the following conditions (A hydrogen-absorbing alloy produced by the gas atomizing process is referred to as the alloy $\hat{2}$).

According to the gas atomizing process, after heating and melting a hydrogen-absorbing alloy composition, a compressed gas is jetted against the alloy at a predetermined angle so as to powder the alloy. To be more specific, the hydrogen-absorbing alloy composition is heated to about 1350° C. and melted in a crucible, and the resulting melt is dropped from a narrow opening while an argon gas having an about 10 atmospheric pressure is jetted against the opening at a predetermined angle so as to make the alloy melt be atomized into powder.

The hydrogen-absorbing alloy thus produced is referred to as the alloy A17 of the present invention. The alloy $\hat{2}$ produced by the gas atomizing process had an average particle diameter of 50 $\mu$m.

As the inert gas, nitrogen gas can be used instead of argon gas. In addition, a slight amount (about 10 volume % or below) of hydrogen gas can be added to the argon gas or nitrogen gas so as to reduce the surface of the hydrogen-absorbing alloy powder. As a result, the electrochemical characteristic of the hydrogen-absorbing alloy particles is improved.

(COMPARATIVE EXAMPLE 1)

Another hydrogen-absorbing alloy was produced in the same manner as in the embodiment 1 except that the initial pH of the hydrochloric acid was set at 4.

The hydrogen-absorbing alloy thus produced is hereinafter referred to as the comparative alloy X1.

(COMPARATIVE EXAMPLE 2)

After having been heat-treated for 10 hours at 800° C., the alloy $\hat{1}$ was subjected to an acid treatment with a hydrochloric acid solution in which 1 wt % cobalt hydroxide was dissolved. This comparative example 2 differs from the embodiment 2 in that the heat treatment was conducted before the acid treatment.

The hydrogen-absorbing alloy thus produced is hereinafter referred to as the comparative alloy X2.

(COMPARATIVE EXAMPLE 3)

Another hydrogen-absorbing alloy was produced in the same manner as in the comparative example 2 except that the acid treatment was conducted by using a hydrochloric acid solution to which no metallic ions were added.

The hydrogen-absorbing alloy thus produced is hereinafter referred to as the comparative alloy X3.

(COMPARATIVE EXAMPLE 4)

Another hydrogen-absorbing alloy was produced in the same manner as in the comparative example 2 except that no acid treatment was conducted.

The hydrogen-absorbing alloy thus produced is hereinafter referred to as the comparative alloy X4.

(EXPERIMENT)

Test cells and nickel-hydrogen storage cells were manufactured by using the above-mentioned alloys as negative electrode active materials, and their electrochemical characteristics (high-rate discharge characteristic, cell internal pressure characteristic, and cycle characteristic) were measured. Based on the measured results, the relationship between different treatments and the electrochemical characteristics was clarified.

A method of measuring high-rate discharge characteristic

Test cells for measuring high-rate discharge characteristics were produced as follows. 1.2 g of carbonyl nickel as a conductive agent and 0.2 g of polytetrafluoroethylene powder as a binder were added to and mixed with 1 g of each alloy powder so as to prepare alloy paste. Each alloy paste was wrapped with nickel mesh and pressed to form a hydrogen-absorbing alloy electrode (negative electrode). This hydrogen-absorbing alloy electrode was placed in a container together with a well-known sintered-type nickel electrode (positive electrode) having a larger capacity than the negative electrode. After an excessive amount of potassium hydroxide was poured as electrolyte, the container was sealed to complete a test cell.

This test cell was charged for 8 hours with the current value of 50 mA per 1 g of a hydrogen-absorbing alloy (50 mA/g—alloy), rested for 1 hour, and discharged with the current value of 200 mA/g—alloy until the discharge end voltage reached 1.0 V. The discharge capacity (CH) at this moment was measured. Then, the discharge was suspended for 1 hour to restore the voltage of the test cell and restarted with the current value of 50 mA/g—alloy until the discharge end voltage reached 1.0 V. The discharge capacity (CL) at this moment was measured. By using CH and CL, the electrochemical activity (%) of each of the treated alloys was calculated based on Equation 1, and the obtained value has been regarded as a high-rate discharge characteristic value.

high-rate discharge characteristic value (activity %)=CH/(CH+CL)×100 - - - Formula 1

A method of measuring the cell internal pressure and cycle characteristic

The cell internal pressure and cycle characteristic were measured by using nickel-hydrogen storage cells. The nickel-hydrogen storage cells were produced as follows: 5 wt % of polytetrafluoroethylene powder as a binder was added to and mixed with alloy powder in order to produce alloy paste. This paste was applied onto both surfaces of the electric collector made of a punched metal and pressed to form a hydrogen-absorbing alloy electrode. Then, this electrode (negative electrode) and a well-known sintered-type nickel electrode (positive electrode) having a smaller capacity than the negative electrode were coiled with a separator therebetween so as to form a coiled electrode member, and placed in an outer can. After a 30 wt % potassium hydroxide aqueous solution was poured, the outer can was sealed. Thus, a cylindrical nickel-hydrogen storage cell having a theoretical capacity of 1000 mAh was produced.

The nickel-hydrogen storage cell was subjected to an activation treatment by repeating the following cycle three times at room temperature: the cell was charged for 16 hours with 100 mA, rested for 1 hour, discharged with 200 mA until the discharge end voltage reached 1.0 V, and rested again for 1 hour.

The cell internal pressure was measured after the storage cell subjected to the above-mentioned activation treatment was charged for 1.5 hours with 1000 mA.

On the other hand, the cycle characteristic was measured by repeating the following cycle: each of the storage cells subjected to the activation treatment was charged for 48 minutes with 1500 mA, rested for 1 hour, discharged with 1500 mA until the discharge end voltage reached 1.0 V, and rested again for 1 hour. Then, the number of cycles before the discharge capacity became below 500 mAh was counted. This cycle number has been regarded as a cycle characteristic value (cell life value) so as to evaluate the cycle characteristic of each alloy.

The results of each alloy are shown in Table 1 below with alloy treatment conditions.

that applying a heat treatment after the acid treatment with an acid treatment solution further improves the cell characteristics (cell internal pressure, high-rate discharge characteristic, cycle life).

In the comparison with the alloys A1–A4 of the present invention, the comparative alloy X1, which used an acid treatment solution having an initial pH of 4 exhibited strikingly poor cell characteristics as compared with the alloys A1–A4 of the present invention, which used acid treatment solutions having an initial pH in the range of 0.5 to 3. This result indicates that the initial pH of the treatment solution must be 3 or below.

Furthermore, the comparison between the alloy A2 of the present invention and the alloys A5–A8 of the present invention, all of which have the same initial pH and differ only in the types of metallic ions shows that the cell characteristics obtained by using a treatment solution containing either nickel ions, nickel ions+cobalt ions, or cobalt

TABLE 1

| alloy types | pH of hydrochloric acid | | ions dissolved in hydrochloric acid | KOH concentration (wt %) | heat treatment temperature (° C.) | cell internal pressure (kg/cm²) | high-rate discharge characteristic (%) | cycle life (counts) |
|---|---|---|---|---|---|---|---|---|
| A1 | ① | 0.5 | cobalt | — | 800 | 6.0 | 90 | 1700 |
| A2 | ① | 1 | cobalt | — | 800 | 6.0 | 90 | 1700 |
| A3 | ① | 2 | cobalt | — | 800 | 6.0 | 90 | 1700 |
| A4 | ① | 3 | cobalt | — | 800 | 6.0 | 90 | 1700 |
| A5 | ① | 1 | nickel | — | 800 | 6.0 | 90 | 1700 |
| A6 | ① | 1 | nickel cobalt | — | 800 | 6.0 | 90 | 1700 |
| A7 | ① | 1 | copper | — | 800 | 7.0 | 83 | 1500 |
| A8 | ① | 1 | cobalt aluminum | — | 800 | 4.0 | 90 | 1750 |
| A9 | ① | 1 | cobalt | — | 300 | 6.0 | 90 | 1700 |
| A10 | ① | 1 | cobalt | — | 500 | 6.0 | 90 | 1700 |
| A11 | ① | 1 | cobalt | — | 900 | 6.0 | 90 | 1700 |
| A12 | ① | 1 | cobalt | — | 1000 | 6.0 | 90 | 1500 |
| A13 | ① | 1 | cobalt | 5 | 800 | 6.0 | 90 | 1700 |
| A14 | ① | 1 | cobalt | 15 | 800 | 5.0 | 90 | 1700 |
| A15 | ① | 1 | cobalt | 30 | 800 | 5.0 | 90 | 1700 |
| A16 | ① | 1 | cobalt | 40 | 800 | 5.0 | 85 | 1700 |
| A17 | ② | 1 | cobalt | 30 | 800 | 4.0 | 90 | 1800 |
| X1 | ① | 4 | cobalt | — | 800 | 9.0 | 65 | 950 |
| X2 | ① | 1 | cobalt | — | (800) | 8.0 | 85 | 1400 |
| X3 | ① | 1 | — | — | (800) | 10.0 | 72 | 1100 |
| X4 | ① | — | — | — | (800) | 10.0 | 60 | 917 |

The heat treatment temperatures in X2–X4 are in parenthesis because the heat treatments were conducted before the acid treatments. Table 1 indicates the following. The alloys A1–A17 of the present invention, which were subjected to an acid treatment with a metallic ion- containing treatment solution and then subjected to a heat treatment, are superior to the comparative alloys X1–X4 in the high-rate discharge characteristic and cycle characteristic.

Furthermore, the comparison between the comparative alloy X4, which was not subjected to an acid treatment, and the comparative alloy X3, which was subjected to an acid treatment with an acid treatment solution containing no metallic ions indicates that an acid treatment improves the high-rate discharge characteristic and cycle life. The comparison between the comparative alloy X3 and the comparative alloy X2, which was subjected to an acid treatment with a metallic ion-containing acid treatment solution, indicates that adding metallic ions to the acid treatment solution not only improves the high-rate discharge characteristic and cycle life but also restricts an increase in the cell internal pressure. In addition, the comparison between the comparative alloy X2 and the alloy A2 of the present invention shows ions+aluminum ions are better than those obtained by using a treatment solution containing copper ions. The alloy A8, which was subjected to an acid treatment with a treatment solution containing cobalt ions and aluminum ions exhibited particularly excellent results. From these results, it is preferable to use nickel ions and/or cobalt ions as metallic ions contained in the treatment solution, and it is further preferable to use metallic ions having a pH buffer capacity such as aluminum ions together with other metallic ions.

The alloy A2 and the alloys A9–A12 of the present invention all of which had the same initial pH and metallic ions and differed only in heat treatment temperature showed excellent cell characteristics; however, the alloy A12 whose heat treatment temperature was 1000° C. had a shorter cycle life than the alloys A2 and A9–A11 whose heat treatment temperatures were in the range of 300 to 900° C. This result indicates that the preferable temperatures for the heat treatment are in the range of 300 to 900° C.

Furthermore, the comparison between the alloys A13–A16 of the present invention, which were soaked in an alkali solution before the application of a heat treatment and the alloy A2 of the present invention, which was not soaked in an alkali solution showed that soaking an alloy in an alkali solution whose alkali concentration was in the range of 15 wt % to 40 wt % before the application of the heat treatment had an effect of reducing the cell internal pressure. This result indicates that it is preferable to soak an alloy in an alkali solution before the application of a heat treatment, and to make the alkali concentration be in the range of 15 wt % to 40 wt %.

Furthermore, the comparison between the alloy A15 of the present invention, which uses the alloy 1̂ prepared by the pulverization process and the alloys A17 of the present invention, which uses the alloy 2̂ prepared by the gas atomizing process shows that the gas atomizing process is superior to the pulverization process in both the cell internal pressure and the cycle life.

As apparent from the above-mentioned comparison results, when a hydrogen-absorbing alloy is subjected to a heat treatment in an atmosphere with the presence of hydrogen after the application of an acid treatment with a metallic ion-containing acid treatment solution, the high-rate discharge characteristic, cell internal pressure characteristic, and cycle characteristic are remarkably improved.

In addition, soaking a hydrogen-absorbing alloy in an alkali solution before the application of the heat treatment makes a metal such as cobalt evenly coat the alloy surface, which further improves the cell characteristics.

These effects of the present invention are considered to result from the following. When a hydrogen-absorbing alloy is heat-treated in an atmosphere with the presence of hydrogen, hydroxides are reduced to a metallic state, the segregation of the alloy is decreased, and an anti-corrosive coating is formed over the alloy surface.

What is claimed is:

1. A method of manufacturing a hydrogen-absorbing alloy for use in an alkali storage cell comprising the steps of:

applying an acid treatment to a surface of said hydrogen-absorbing alloy by using a metallic ion-containing treatment solution which contains metallic ions and whose initial pH is in a range of 0.5 to 3.0; and applying a heat treatment to said hydrogen-absorbing alloy in an atmosphere with a presence of hydrogen.

2. The method of claim 1, wherein said metallic ions are selected from nickel ions, cobalt ions, and a combination of nickel ions and cobalt ions.

3. The method of claim 2, wherein temperatures of said heat treatment are in a range of 300 to 900° C.

4. The method of claim 3, wherein said metallic ion-containing treatment solution has a pH buffer capacity for keeping a pH of said metallic ion-containing treatment solution within a range of 4 to 6.

5. The method of claim 4, wherein said metallic ion-containing treatment solution contains aluminum ions.

6. The method of claim 5, wherein said hydrogen-absorbing alloy is prepared by a gas atomizing process.

7. The method of claim 1, wherein temperatures of said heat treatment are in a range of 300 to 900° C.

8. The method of claim 1, wherein said metallic ion-containing treatment solution has a pH buffer capacity for keeping a pH of said metallic ion-containing treatment solution within a range of 4 to 6.

9. The method of claim 1, wherein said metallic ion-containing treatment solution contains aluminum ions.

10. The method of claim 1, wherein said hydrogen-absorbing alloy is prepared by a gas atomizing process.

11. A method of manufacturing a hydrogen-absorbing alloy for use in an alkali storage cell comprising the steps of:

applying an acid treatment to a surface of said hydrogen-absorbing alloy by using a metallic ion-containing treatment solution which contains metallic ions and whose initial pH is in a range of 0.5 to 3.0;

applying an alkali treatment to the surface of said hydrogen-absorbing alloy by using an alkali solution; and applying a heat treatment to said hydrogen-absorbing alloy in an atmosphere with a presence of hydrogen.

12. The method of claim 11, wherein said metallic ions are selected from nickel ions, cobalt ions, and a combination of nickel ions and cobalt ions.

13. The method of claim 12, wherein temperatures of said heat treatment are in a range of 300 to 900° C.

14. The method of claim 13, wherein said alkali solution contains alkali metal whose concentration is in a range of 15 to 40 wt %.

15. The method of claim 14, wherein said metallic ion-containing treatment solution has a pH buffer capacity for keeping a pH of said metallic ion-containing treatment solution within a range of 4 to 6.

16. The method of claim 15, wherein said metallic ion-containing treatment solution contains aluminum ions.

17. The method of claim 16, wherein said hydrogen-absorbing alloy is prepared by a gas atomizing process.

18. The method of claim 11, wherein temperatures of said heat treatment are in a range of 300 to 900° C.

19. The method of claim 11, wherein said alkali solution contains alkali metal whose concentration is in a range of 15 to 40 wt %.

20. The method of claim 11, wherein said metallic ion-containing treatment solution has a pH buffer capacity for keeping a pH of said metallic ion-containing treatment solution within a range of 4 to 6.

21. The method of claim 11, wherein said metallic ion-containing treatment solution contains aluminum ions.

22. The method of claim 11, wherein said hydrogen-absorbing alloy is prepared by a gas atomizing process.

* * * * *